United States Patent
Lee et al.

(10) Patent No.: US 9,738,399 B2
(45) Date of Patent: Aug. 22, 2017

(54) UNMANNED AERIAL VEHICLE CONTROL METHOD AND UNMANNED AERIAL VEHICLE USING SAME

(71) Applicant: HON HAI PRECISION INDUSTRY CO., LTD., New Taipei (TW)

(72) Inventors: Hou-Hsien Lee, New Taipei (TW);
Chang-Jung Lee, New Taipei (TW);
Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 14/812,246

(22) Filed: Jul. 29, 2015

(65) Prior Publication Data

US 2017/0029134 A1    Feb. 2, 2017

(51) Int. Cl.
| G05D 1/00 | (2006.01) |
| G05D 3/00 | (2006.01) |
| B64D 45/04 | (2006.01) |
| B64C 39/02 | (2006.01) |
| B64D 47/08 | (2006.01) |
| G05D 1/06 | (2006.01) |

(52) U.S. Cl.
CPC ............ *B64D 45/04* (2013.01); *B64C 39/024* (2013.01); *B64D 47/08* (2013.01); *G05D 1/0676* (2013.01)

(58) Field of Classification Search
None
See application file for complete search history.

(56) References Cited

U.S. PATENT DOCUMENTS

| 5,716,032 A * | 2/1998 | McIngvale ............ B64C 39/024 244/185 |
| 6,043,759 A * | 3/2000 | Paterson ................ G01C 5/005 340/946 |
| 6,130,705 A * | 10/2000 | Lareau ..................... G01C 3/08 348/144 |
| 6,148,250 A * | 11/2000 | Saneyoshi .............. G01C 5/005 348/117 |
| 6,694,228 B2 * | 2/2004 | Rios ..................... G05D 1/0094 244/17.13 |
| 6,714,663 B1 * | 3/2004 | Bornowski ........... G06T 7/0081 382/106 |
| 7,239,339 B2 * | 7/2007 | Nagai ..................... G01S 11/12 348/116 |
| 8,473,125 B2 * | 6/2013 | Rischmuller .......... A63H 27/12 244/17.13 |

(Continued)

*Primary Examiner* — Bhavesh V Amin
(74) *Attorney, Agent, or Firm* — Steven Reiss

(57) ABSTRACT

A control method for an unmanned aerial vehicle (UAV) is provided. The method includes: obtaining, from a depth-sensing camera, images of a surface below the unmanned aerial vehicle; obtaining, from a gyroscope, current pitch angle of the unmanned aerial vehicle; determining, at the unmanned aerial vehicle, a current altitude of the unmanned aerial vehicle based on the images and the current pitch angle; determining, at the unmanned aerial vehicle, whether the current altitude of the unmanned aerial vehicle is less than a predefined value; and controlling, at the unmanned aerial vehicle, a drive unit to rotate so as to cause the unmanned aerial vehicle to slow down in a balanced condition if the current altitude of the unmanned aerial vehicle is less than a predefined value.

16 Claims, 13 Drawing Sheets

(56) References Cited

U.S. PATENT DOCUMENTS

| | | | | |
|---|---|---|---|---|
| 8,474,761 B2* | 7/2013 | Callou | A63H 27/12 | 244/17.13 |
| 8,498,447 B2* | 7/2013 | Derbanne | G06T 7/2073 | 382/103 |
| 8,583,296 B2* | 11/2013 | Allen | B64D 45/00 | 701/4 |
| 8,711,206 B2* | 4/2014 | Newcombe | G06T 7/0044 | 348/142 |
| 8,918,209 B2* | 12/2014 | Rosenstein | B25J 11/009 | 700/245 |
| 8,930,019 B2* | 1/2015 | Allen | G05D 1/0248 | 348/46 |
| 8,942,917 B2* | 1/2015 | Chrysanthakopoulos | G06F 17/3079 | 701/410 |
| 8,983,684 B2* | 3/2015 | Callou | A63H 27/12 | 701/1 |
| 9,427,874 B1* | 8/2016 | Rublee | B25J 9/1697 | |
| 9,429,953 B1* | 8/2016 | Miller | G05D 1/0676 | |
| 9,513,635 B1* | 12/2016 | Bethke | G05D 1/042 | |
| 2002/0077731 A1* | 6/2002 | Hilb | G05D 1/0607 | 701/4 |
| 2005/0125142 A1* | 6/2005 | Yamane | G01C 11/00 | 701/510 |
| 2005/0165517 A1* | 7/2005 | Reich | A63H 27/04 | 701/11 |
| 2007/0043482 A1* | 2/2007 | Aimar | G01C 23/00 | 701/4 |
| 2010/0292868 A1* | 11/2010 | Rotem | G06T 7/2033 | 701/2 |
| 2011/0049290 A1* | 3/2011 | Seydoux | A63H 27/12 | 244/17.13 |
| 2011/0091096 A1* | 4/2011 | Morris | G03B 19/22 | 382/154 |
| 2011/0137547 A1* | 6/2011 | Kwon | G01C 11/02 | 701/532 |
| 2011/0178658 A1* | 7/2011 | Kotaba | G01C 21/005 | 701/3 |
| 2011/0270470 A1* | 11/2011 | Svoboda | G05D 1/0607 | 701/3 |
| 2011/0311099 A1* | 12/2011 | Derbanne | G06T 7/2073 | 382/103 |
| 2012/0265374 A1* | 10/2012 | Yochum | G05D 1/0005 | 701/5 |
| 2012/0300070 A1* | 11/2012 | Ohtomo | G01C 11/02 | 348/144 |
| 2012/0320203 A1* | 12/2012 | Liu | G01C 11/04 | 348/144 |
| 2013/0253733 A1* | 9/2013 | Lee | B64C 19/00 | 701/2 |
| 2013/0325244 A1* | 12/2013 | Wang | G05D 1/028 | 701/26 |
| 2014/0052555 A1* | 2/2014 | MacIntosh | G06Q 20/208 | 705/23 |
| 2014/0240498 A1* | 8/2014 | Ohtomo | B64D 47/08 | 348/144 |
| 2015/0094952 A1* | 4/2015 | Moeglein | G06K 9/00671 | 701/491 |
| 2015/0097084 A1* | 4/2015 | Szabo | B64G 1/1078 | 244/171.1 |
| 2015/0325064 A1* | 11/2015 | Downey | G08G 5/006 | 701/29.3 |

* cited by examiner

UNMANNED AERIAL VEHICLE CONTROL METHOD AND UNMANNED AERIAL VEHICLE USING SAME

FIELD

The subject matter herein generally relates to an unmanned aerial vehicle control method and an unmanned aerial vehicle.

BACKGROUND

Unmanned aerial vehicles (UAVs) become more widely used, for example, for performing surveillance, reconnaissance, and exploration tasks for military and civilian applications. Generally, before an UAV is controlled to land at a target surface by a remoter. Sometimes, the target surface is not a desired surface suitable for landing, for example, a bumpy and pitted road. Sometimes, the UAV may be crashed by an obstruction during a landing process due to unskilled operations. Therefore, there is a need for an UAV control method capable of providing a relatively smooth landing under a condition that where ever the UAV lands and whoever operates the UAV.

BRIEF DESCRIPTION OF THE DRAWINGS

Implementations of the present technology will now be described, by way of example only, with reference to the attached figures.

DETAILED DESCRIPTION

Figure 1:
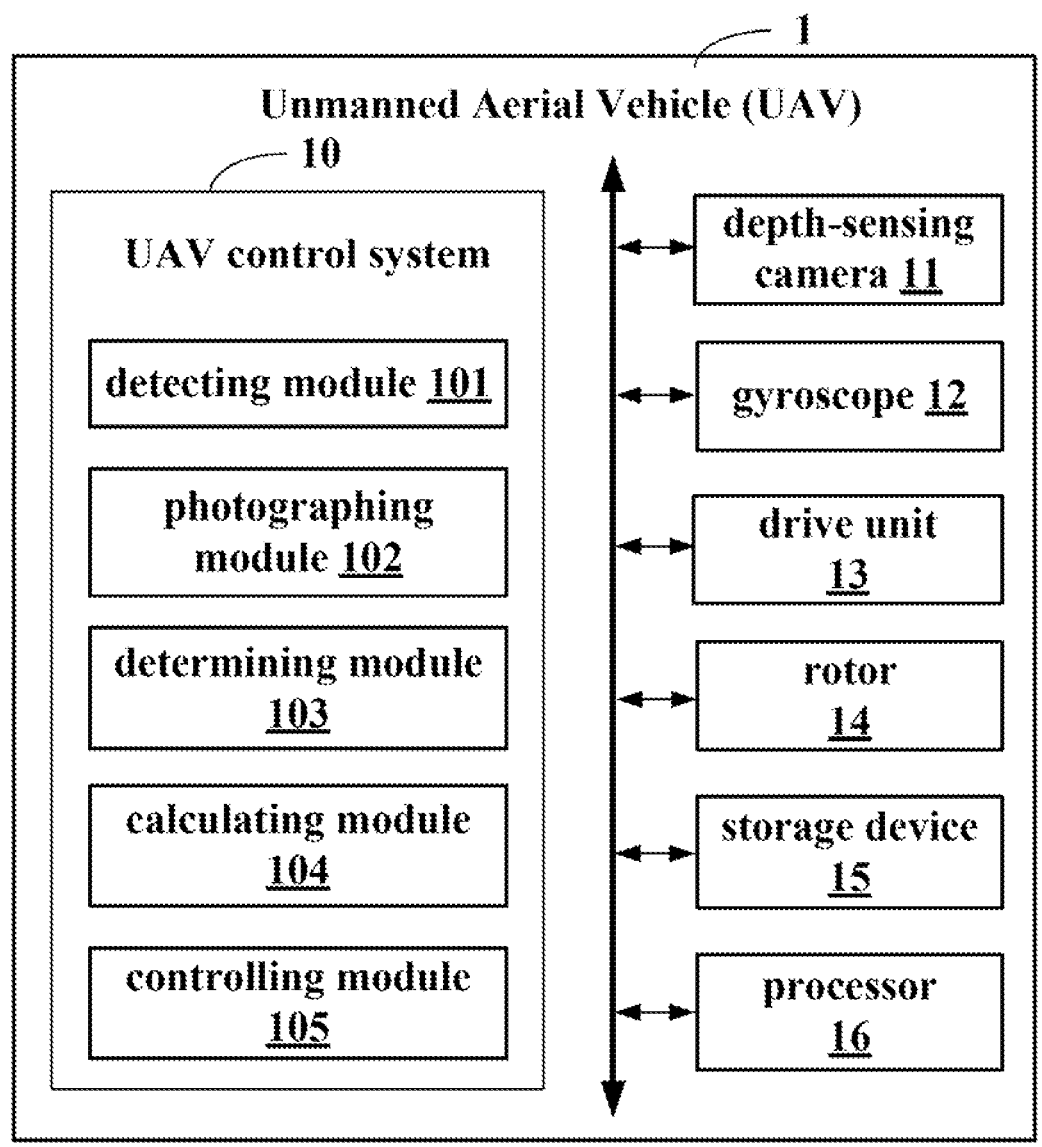
FIG. 1 is a block diagram of an exemplary embodiment of an UAV.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

FIG. 1 illustrates a diagram of an exemplary embodiment of an unmanned aerial vehicle (UAV) 1. In the exemplary embodiment, the UAV 1 can include, but not limited to, a depth-sensing camera 11, a gyroscope 12, at least one drive unit 13, at least one rotor 14, a storage device 15, and a processor 16. The storage device 15 can be configured to store data related to operation of the UAV 1. The processor 16 can be configured to control operations of the UAV 1.

Figure 3:
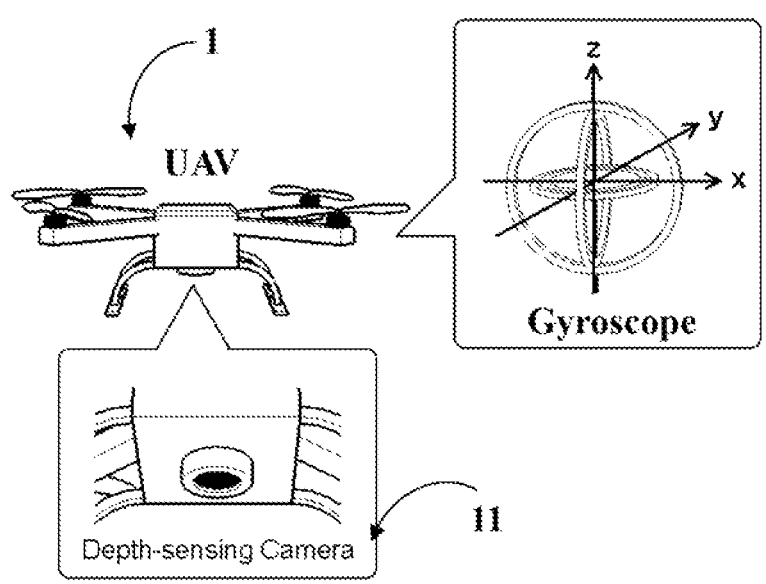
FIG. 3 is a diagrammatic view of an exemplary embodiment of an UAV with a gyroscope and a depth-sensing camera.
Figure 4:
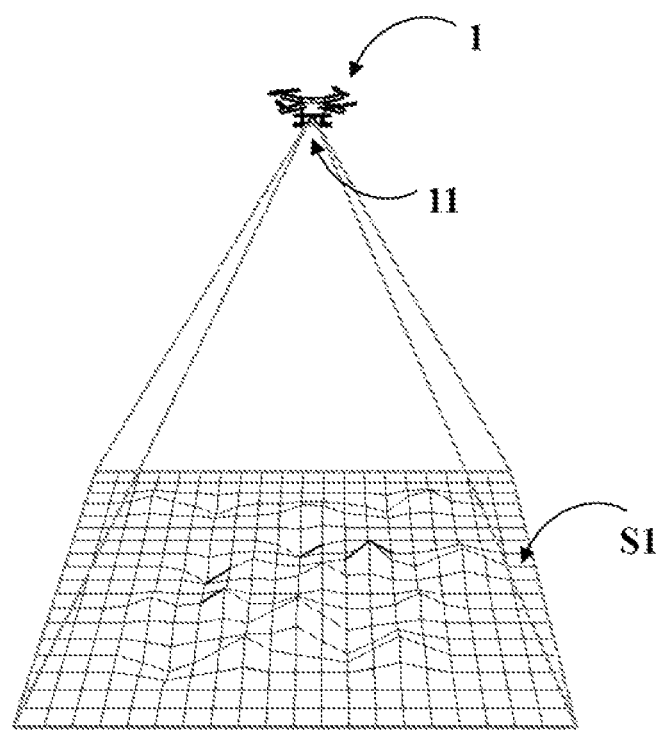
FIG. 4 is a diagrammatic view of an exemplary embodiment of photographing the surface below an UAV.

The depth-sensing camera 11 can be arranged at a bottom of the UAV 1 and configured to take images below the UAV 1 as illustrated in FIG. 3. The depth-sensing camera 11 can have a photographing range, for example, a photographing range S1 as illustrated in FIG. 4. The photographing range can be a square or a rectangle with a predefined length and a predefined width. In at least one embodiment, the photographing range can be any suitable shape, for example, a circle centered at a projection of a center of the UAV 1 at the surface. In at least one embodiment, the depth-sensing camera 11 can be arranged at any suitable position of the UAV 1, for example, a side of the UAV 1. The image taken by the depth-sensing camera 11 can include depth information based on which an altitude of the UAV can be obtained.

The gyroscope 12 can be configured to detect attitude data of the UAV, including pitch angles, angular velocity and orientation. In at least one embodiment, the gyroscope 12 can be substituted by a currently available inertial measurement unit (IMU).

The least one drive unit 13 can be configured to drive the at least one rotor 14 to rotate to move the UAV 1. In the exemplary embodiment, the drive unit 13 can be a motor.

The storage device 15 can be an internal storage unit of the UAV 1, for example, a hard disk or memory, or a pluggable memory, for example, Smart Media Card, Secure Digital Card, Flash Card. In at least one embodiment, the storage device 15 can include two or more storage devices such that one storage device is an internal storage unit and the other storage device is a pluggable memory. The processor 16 can be a central processing unit (CPU), a microprocessor, or other data processor chip that performs functions of the UAV 1.

An UAV control system 10 can include computerized instructions in the form of one or more programs that can be stored in the storage device 15 and executed by the processor 16. In the embodiment, the UAV control system 10 can be integrated in the processor 16. In at least one embodiment, the UAV control system 10 can be independent from the processor 16. Referring to FIG. 1, the system 10 can include one or more modules, for example, a detecting module 101, a photographing module 102, a determining module 103, a calculating module 104, and a controlling module 105. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The detecting module 101 can be configured to detect current attitude data. In the exemplary embodiment, the attitude data can include angular velocity, orientation, and pitch angles.

The photographing module 102 can be configured to control the depth-sensing camera 11 to take images below the UAV 1.

The determining module 103 can be configured to determine whether a current altitude of the UAV is less than a predefined value, for example, 10 m, 15 m, 20 m or any desirable values. The determining module 103 further can be configured to determine whether a surface directly below the UAV 1 is a desirable surface for landing based on depth information of the images taken by the depth-sensing camera 11. The determining module 103 further can be configured to determine whether a surface adjacent to the surface directly below the UAV 1 is a desirable surface for landing based on depth information of the images taken by the depth-sensing camera 11 when the surface directly below the UAV 1 is not suitable for landing.

The calculating module 104 can be configured to calculate drive data based on the attitude data.

Figure 11:
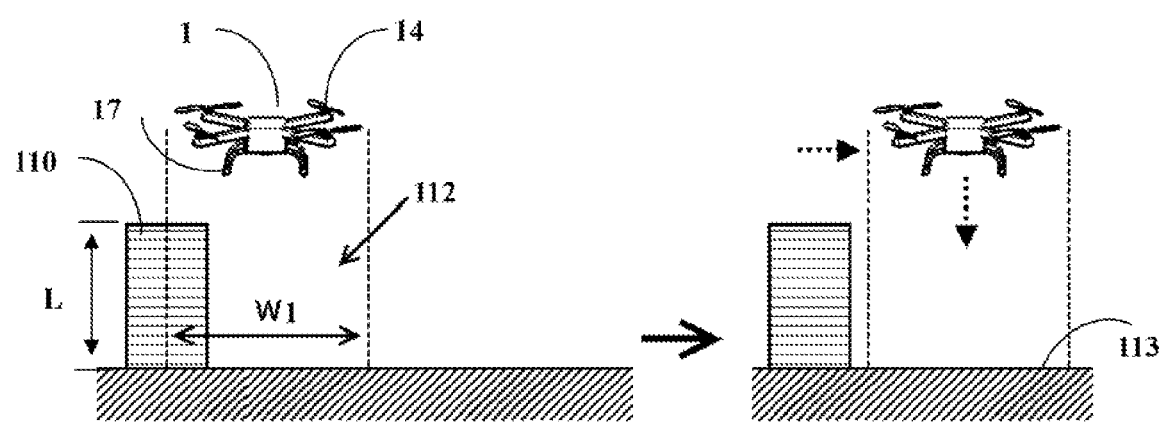
FIG. 11 is a diagrammatic view of an exemplary embodiment of an UAV moving away from an obstruction.
Figure 12:
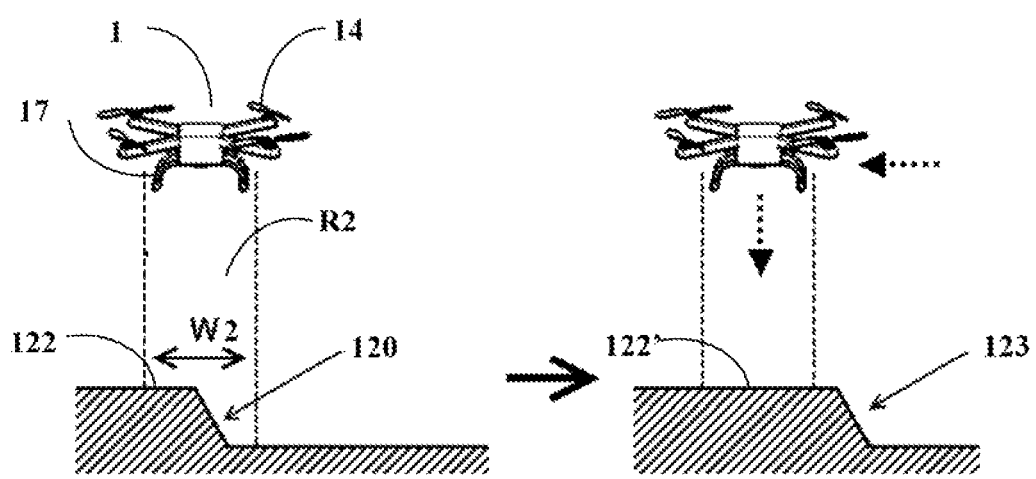
FIG. 12 is a diagrammatic view of an exemplary embodiment of an UAV moving to a desirable surface.
Figure 13:
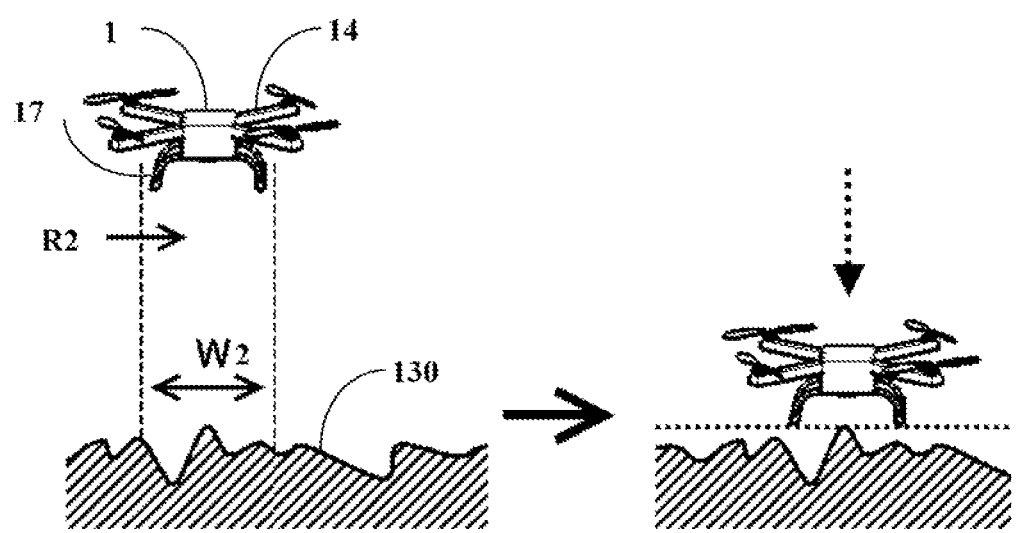
FIG. 13 is a diagrammatic view of an exemplary embodiment of an UAV hovering at a bumpy surface.

The controlling module 105 can be configured to control the drive unit 13 to rotate the rotors so as to move the UAV 1 to a desirable position in a desirable way based on the drive data. For example, if the surface directly below the UAV 1 is suitable for landing, the drive data can control the drive unit to drive the rotors 14 to rotate so as to cause the UAV 1 to land slowly at the surface directly below the UAV 1. If the surface directly below the UAV 1 is not suitable for landing, and there is a desirable surface nearby suitable for landing, the drive data can control the drive unit to drive the rotors 14 to rotate so as to cause the UAV 1 to move to an adjacent desirable surface suitable for landing as illustrated at FIGS. 11 and 12. If the surface directly below the UAV 1 is not suitable for landing, and there is no desirable surface nearby suitable for landing, the drive data can control the drive unit to drive the rotors 14 to rotate so as to cause the UAV 1 to hover evenly at the surface directly below the UAV 1 as illustrated at FIG. 13.

Figure 2:
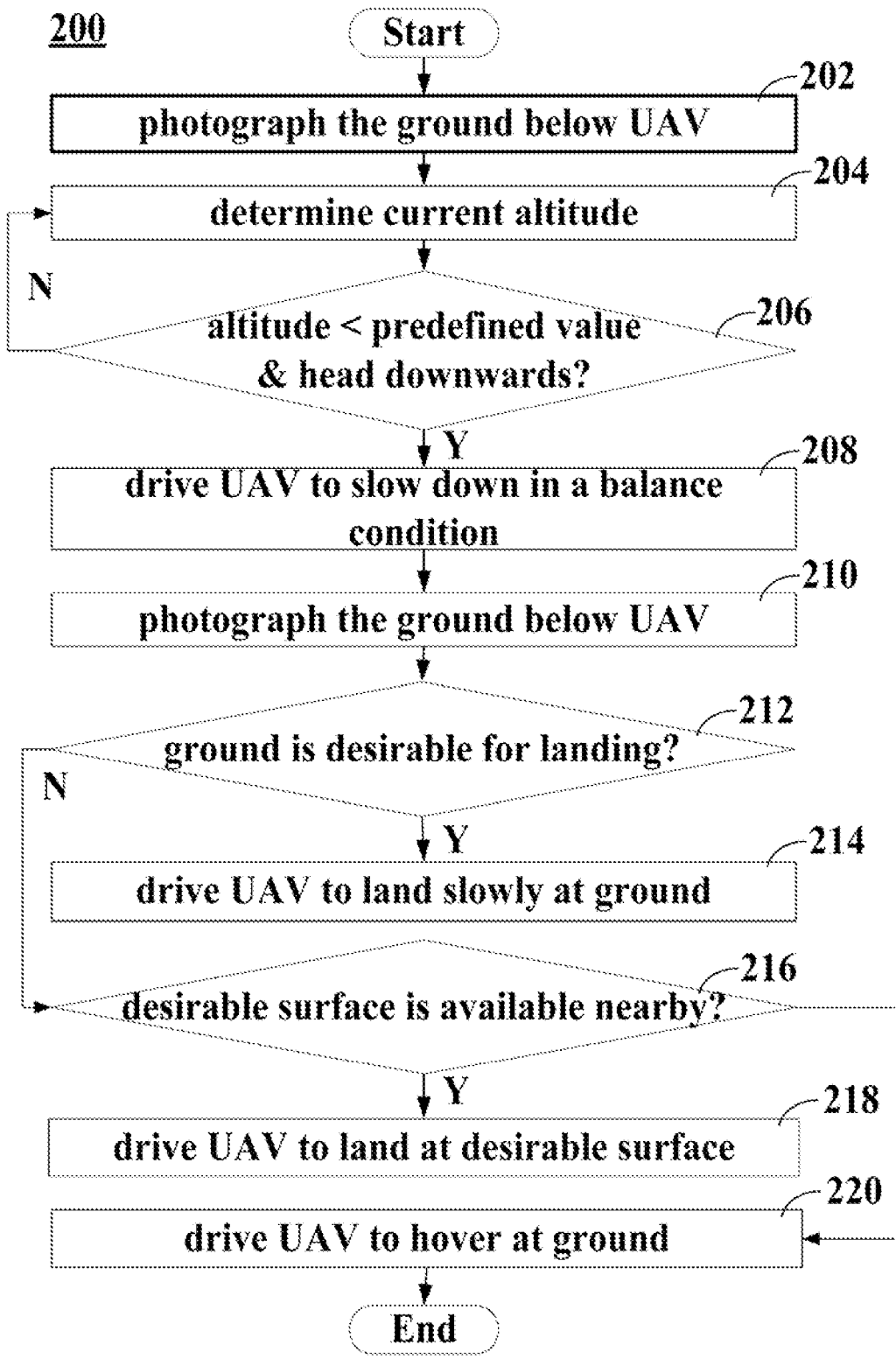
FIG. 2 is a flowchart of an exemplary embodiment of an UAV control method.

Referring to FIG. 2, a flowchart is presented in accordance with an example embodiment of an UAV control system which is being thus illustrated. The example method 200 is provided by way of example, as there are a variety of ways to carry out the method. The method 200 described below can be carried out using the configurations illustrated in FIG. 1, for example, and various elements of the figure is referenced in explaining example method 200. Each block shown in FIG. 2 represents one or more processes, methods or subroutines, carried out in the exemplary method 200. Furthermore, the illustrated order of blocks is by example only and the order of the blocks can change according to the present disclosure. Additional blocks may be added or fewer blocks may be utilized, without departing from this disclosure. The exemplary method 200 can be executed by an UAV, and can begin at block 202. The UAV can include a depth camera configured to take images of the surface below the UAV, a gyroscope configured to detect current attitude data of the UAV, and a storage device configured to store related information.

At block 202, the UAV controls the depth-sensing camera to take images of the surface below the UAV and the gyroscope to detect current pitch angle of the UAV. The image taken by the depth-sensing camera can include depth information.

Figure 5:
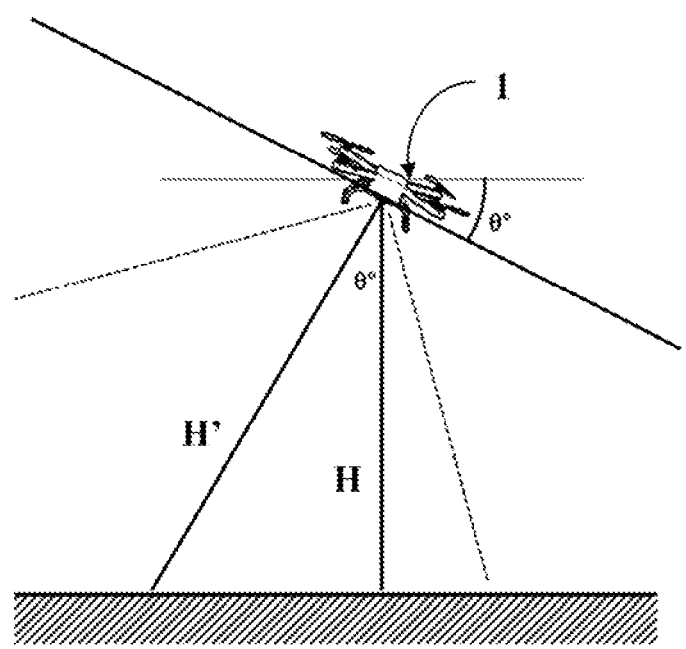
FIG. 5 is a diagrammatic view of an exemplary embodiment of determining current altitude of an UAV.
Figure 6:
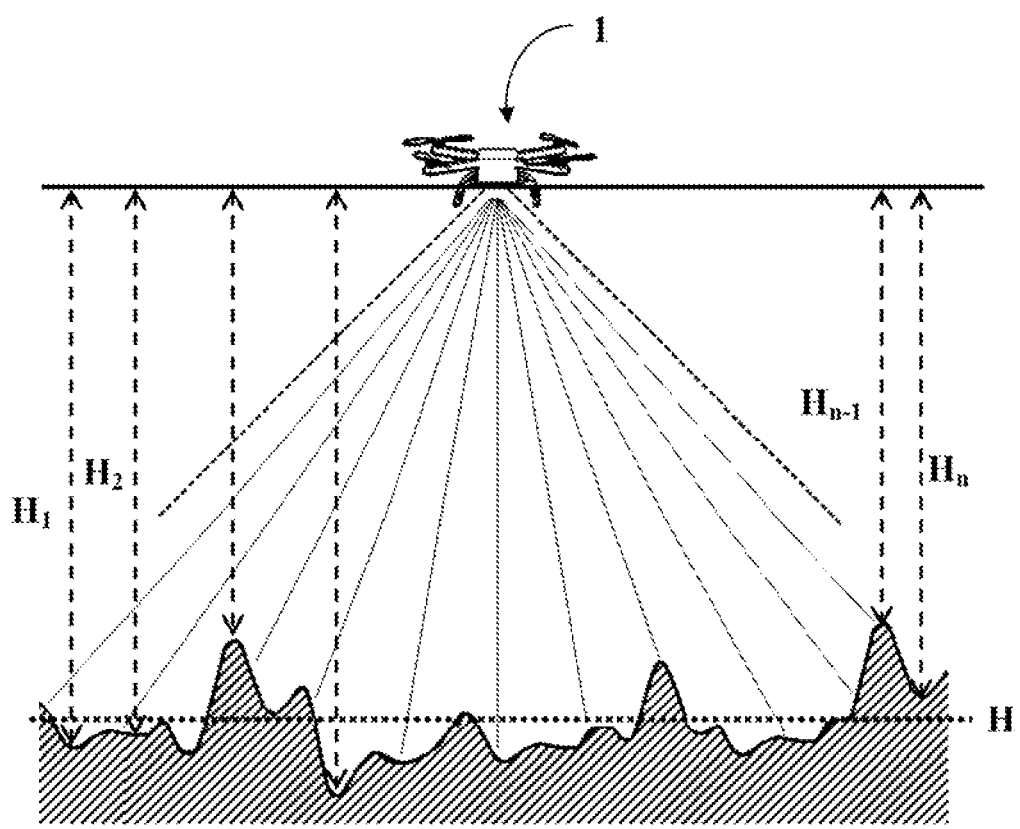
FIG. 6 is a diagrammatic view of another exemplary embodiment of determining current altitude of an UAV.

At block 204, the UAV determines current altitude based on the depth information of the images. In the exemplary embodiment, the UAV can determine whether the surface is bumpy based on the depth information. For example, the image taken by the depth-sensing camera can be divided into a plurality of blocks, each block corresponding to a depth value. If a difference value between depth values of two adjacent blocks exceeds a predefined range, the surface can be determined as bumpy. On the other hand, if the difference value between depth values of two adjacent blocks falls within a predefined range, the surface can be determined as even. If the surface is determined to be even, referring to FIG. 5, the current altitude H can be determined by a formula: $H=H'*\cos\theta$, wherein H' represents a distance from the depth-sensing camera to the surface along a central axis of the UAV, θ represents an angle between the central axis of the UAV and the line perpendicular to the surface. If the surface is determined to be bumpy, referring to FIG. 6, the current altitude H can be an average of at least two different altitudes of the bumpy surface, for example, $H_1, H_2, \ldots H_{n-1}, H_n$.

At block 206, the UAV determines whether the current altitude is less than a predetermined value, for example, 10 m, 15 m, 20 m or other suitable values.

At block 208, the UAV controls the drive unit to drive at least one rotor to rotate so as to have the UAV descended in a balanced and slow way. In detail, the UAV calculates drive data based on the pitched angle and current velocity and then controls the drive unit to drive the rotor to rotate based on the drive data. The balanced way can indicate that the unmanned aerial vehicle is substantially in a horizontal level where the pitch angle of the unmanned aerial vehicle is substantially equal to zero.

At block 210, the UAV controls the depth-sensing camera to take images of the surface under the UAV.

Figure 7:
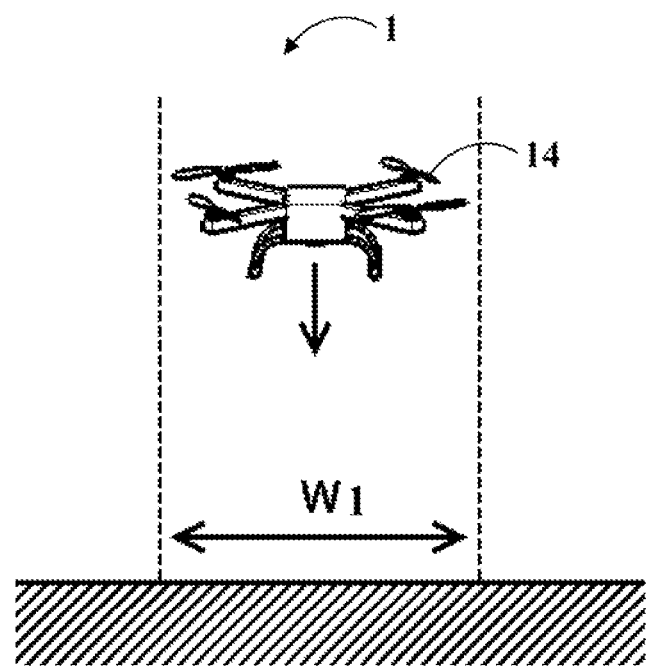
FIG. 7 is an isometric view of an exemplary embodiment of a rotor range of an UAV.
Figure 8:
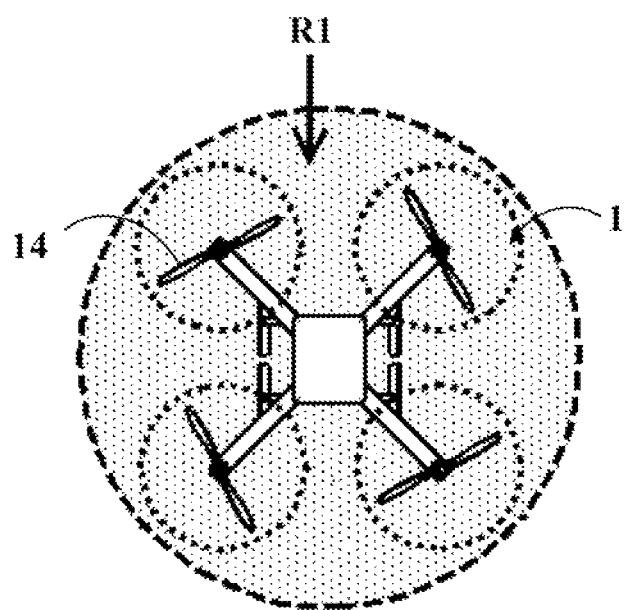
FIG. 8 is a diagrammatic view of the bottom of an exemplary embodiment of a rotor range of an UAV.
Figure 9:
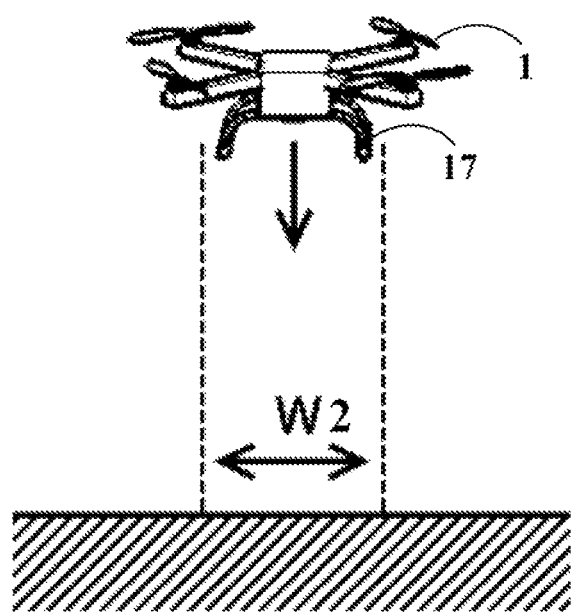
FIG. 9 is an isometric view of an exemplary embodiment of an undercarriage range of an UAV.
Figure 10:
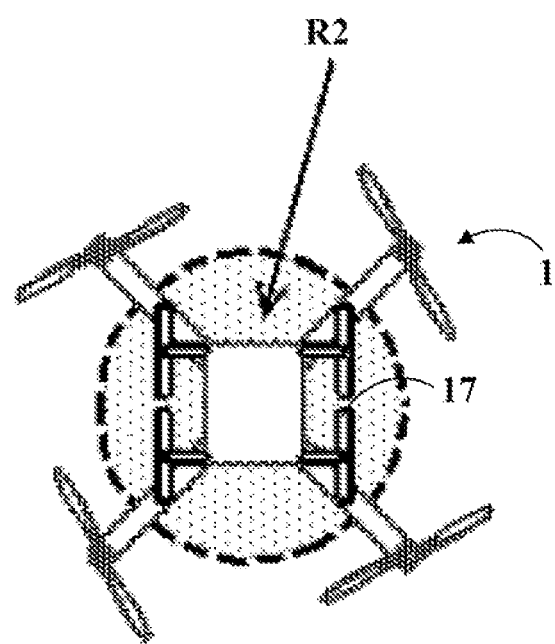
FIG. 10 is a diagrammatic view of the bottom of an exemplary embodiment of an undercarriage range of an UAV.

At block 212, the UAV determines whether the surface is suitable for landing based on the images. In the exemplary embodiment, the UAV can determine the surface directly below the UAV is suitable for landing. The surface directly below the UAV 1 can include a rotor range R1 and an undercarriage range R2. Referring to FIGS. 7 and 8, an exemplary embodiment of a rotor range R1 of an UAV is illustrated. The UAV 1 can include four rotors, and the rotor range R1 can be a circle surrounding the four rotors. The rotor range R1 can have a width W1. In the exemplary embodiment, W1 can be a diameter of the circle surrounding the rotors. In the exemplary embodiment, the rotor range R1 can substantially cover a projection of the UAV 1 at the surface below the UAV 1. Referring to FIGS. 9 and 10, an exemplary embodiment of an undercarriage range R2 is illustrated. The UAV 1 can include an undercarriage 17 configured to support the UAV 1 when the UAV 1 is on a surface, for example, the ground. The undercarriage 17 can be in a substantially rectangle shape, and the undercarriage range R2 can be a circle surrounding the undercarriage 17. The undercarriage range R2 can have a maximum width W2. In the exemplary embodiment, W2 can be a diameter of the circle surrounding the undercarriage 17. The undercarriage range R2 can substantially cover a projection of the undercarriage 17 on the surface below the UAV 1.

The UAV can determine based on depth information of the images. Similar to described above, the images can be divided into a plurality of blocks, each block including corresponding a depth value. If difference values between depth values of two adjacent blocks are within a predefined value, the surface is determined to be even and be suitable for landing. Otherwise, if difference values between depth values of two adjacent blocks are beyond a predefined value, the surface is determined to be bumpy and not be suitable for landing. If the surface is suitable for landing, the process goes to block 214, otherwise, the process goes to block 216.

At block 214, the UAV controls the drive unit to drive the rotors to rotate so as to slowly land the UAV at the surface.

At block 216, the UAV determines whether there is an adjacent suitable surface is available. The UAV obtains depth information of the images of surfaces adjacent to the surface directly below the UAV 1, and then determines whether the adjacent surfaces are suitable for landing. If there is an adjacent surface suitable for landing, the process goes to block 218, otherwise, the process goes to block 220.

At block 218, the UAV 1 controls the drive unit to rotate the rotor to land the UAV at the adjacent suitable surface.

For example, referring to FIG. 11, there is an obstruction 110 with a length L within the rotor range R1. The length L can be greater than a height of the undercarriage 17, for example, 10 cm, thus the obstruction 110 may interference with the rotors 14 of the UAV 1. In this circumstance, the UAV 1 can control the drive unit to drive the rotor 14 to rotate to move away from the obstruction 110 to an adjacent suitable surface 112. In detail, the UAV 1 can determine a distance between the surface 112 directly below the UAV 1 and the adjacent suitable surface 113, calculate drive data based on current angular velocity and the distance, and control the drive unit to drive the rotors 14 to rotate based on the drive data. The distance between the surface 112 directly below the UAV 1 and the adjacent suitable surface 113 can be a distance between a center of the surface 112 directly below the UAV 1 and a center of the adjacent suitable surface 113.

For example, referring to FIG. 12, there is a slope 120 within the undercarriage range R2. If the UAV 1 lands above the slope 120, the UAV 1 may roll over. In this circumstance, the UAV 1 can control the drive unit to drive the rotors 14 to rotate to move the UAV 1 away from the slop 120 to an adjacent suitable surface 123. In detail, the UAV 1 can determine a distance between the surface 122 directly below the UAV 1 and the adjacent suitable surface 123, calculate drive data based on current angular velocity and the distance, and control the drive unit to drive the rotors 14 to rotate based on the drive data. The distance between the surface 122 directly below the UAV 1 and the adjacent suitable surface 123 can be a distance between a center of the surface 122 directly below the UAV 1 and a center of the adjacent suitable surface 123.

At block 220, the UAV 1 controls the drive unit to drive the rotors to rotate to hover at the surface. For example, referring to FIG. 13, the surface 130 directly below the UAV 1 is bumpy and there is no suitable desirable surface available, the UAV 1 can control the drive unit to rotate the rotors so as to hover evenly at the surface 130.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An unmanned aerial vehicle, comprising:
   a storage device configured to store constructions; and
   a processor configured to execute instructions to cause the processor to:
   capture images of a surface below the unmanned aerial vehicle from a depth sensing camera and using a gyroscope to determine the pitch angle of the unmanned vehicle;
   determine a current altitude of the unmanned aerial vehicle based on depth information of the images;
   determine whether the current altitude of the unmanned aerial vehicle is less than a predefined value; and
   control a drive unit to rotate, to balance, and to slow down the unmanned aerial vehicle if the current altitude is less than the predefined value;
   wherein the image is divided into a plurality of blocks, each block having a depth value, and the surface is determined to be suitable for landing if depth values of two adjacent blocks are within a predefined range.

2. The unmanned aerial vehicle according to claim 1, wherein the instructions further causes the processor to:
   determine whether the surface directly below the unmanned aerial vehicle is suitable for landing;
   determine whether there is an adjacent suitable surface for landing if the surface directly below the unmanned aerial vehicle is not suitable for landing; and
   control the drive unit to rotate to cause the unmanned aerial vehicle to land at an adjacent suitable surface if there is an adjacent suitable surface is available.

3. The unmanned aerial vehicle according to claim 2, wherein the instructions further cause the processor to:
   control the drive unit to rotate to cause the unmanned aerial vehicle to hover evenly at the surface below the unmanned aerial vehicle if there is no adjacent suitable surface is available.

4. The unmanned aerial vehicle according to claim 2, wherein the instructions further causes the processor to:
   calculate drive data based on current angular velocity, pitch angle and a distance between the surface directly below the unmanned aerial vehicle and the adjacent suitable surface; and
   control the drive unit to rotate based on the drive data.

5. The unmanned aerial vehicle according to claim 2, wherein the instructions further causes the processor to:
   control the drive unit to rotate to cause the unmanned aerial vehicle to land evenly and slowly at the surface directly below the unmanned aerial vehicle if the surface directly below the unmanned aerial vehicle is suitable for landing.

6. The unmanned aerial vehicle according to claim 1, wherein the current altitude is an average of at least two altitude values of the unmanned aerial vehicle relative to the surfaces.

7. The unmanned aerial vehicle according to claim 1, wherein the instructions further causes the processor to:
   calculate drive data based on current angular velocity and pitch angle; and
   control the drive unit to rotate based on the drive data.

8. A method for controlling an unmanned aerial vehicle comprising:
   obtaining, from a depth-sensing camera, images of a surface below the unmanned aerial vehicle;

obtaining, from a gyroscope, current pitch angle of the unmanned aerial vehicle;

determining, at the unmanned aerial vehicle, a current altitude of the unmanned aerial vehicle based on depth information of the images and the current pitch angle;

determining, at the unmanned aerial vehicle, whether the current altitude of the unmanned aerial vehicle is less than a predefined value; and controlling, at the unmanned aerial vehicle, a drive unit to rotate so as to cause the unmanned aerial vehicle to slow down in a balanced condition if the current altitude of the unmanned aerial vehicle is less than a predefined value;

wherein the image is divided into a plurality of blocks, each block having a depth value, and the surface is determined to be suitable for landing if depth values of two adjacent blocks are within a predefined range.

9. The method according to claim 8, further comprising:

obtaining, from the depth-sensing camera, images of the surface below the unmanned aerial vehicle from the depth-sensing camera;

determining, at the unmanned aerial vehicle, whether the surface directly below the unmanned aerial vehicle is suitable for landing based on depth information of the images;

determining, at the unmanned aerial vehicle, whether there is an adjacent suitable surface for landing based on depth information of the images if the surface directly below the unmanned aerial vehicle is not suitable for landing; and controlling, at the unmanned aerial vehicle, the drive unit to rotate to cause the unmanned aerial vehicle to land at an adjacent suitable surface if there is an adjacent suitable surface is available.

10. The method according to claim 9, further comprising:

controlling the drive unit to rotate to cause the unmanned aerial vehicle to hover evenly at the surface below the unmanned aerial vehicle if there is no adjacent suitable surface is available.

11. The method according to claim 9, further comprising:

calculating, at the unmanned aerial vehicle, drive data based on current angular velocity, pitch angle and a distance between the surface directly below the unmanned aerial vehicle and the adjacent suitable surface; and controlling, at the unmanned aerial vehicle, the drive unit to rotate based on the drive data.

12. The method according to claim 9, further comprising:

controlling, at the unmanned aerial vehicle, the drive unit to rotate to cause the unmanned aerial vehicle to land evenly and slowly at the surface directly below the unmanned aerial vehicle if the surface directly below the unmanned aerial vehicle is suitable for landing.

13. The method according to claim 8, wherein the current altitude is an average of at least two altitude values of the unmanned aerial vehicle relative to the surfaces.

14. The method according to claim 8, further comprising:

calculating, at the unmanned aerial vehicle, drive data based on current angular velocity and pitch angle; and controlling, at the unmanned aerial vehicle, the drive unit to rotate based on the drive data.

15. A non-transitory computer readable medium storing computer readable instructions, the instructions causing a processor to:

obtain images of the surface below an unmanned aerial vehicle from a depth-sensing camera and current pitch angle from a gyroscope;

determine a current altitude of the unmanned aerial vehicle based on depth information of the images;

determine whether the current altitude of the unmanned aerial vehicle is less than a predefined value;

control a drive unit to rotate to cause the unmanned aerial vehicle to slow down in a balanced condition if the current altitude is less than the predefined value;

wherein the image is divided into a plurality of blocks, each block having a depth value, and the surface is determined to be suitable for landing if depth values of two adjacent blocks are within a predefined range.

16. The non-transitory medium according to claim 15, wherein the instructions further cause the processor to:

obtain images of the surface below the unmanned aerial vehicle from the depth-sensing camera;

determine whether the surface directly below the unmanned aerial vehicle is suitable for landing based on depth information of the images;

determine whether there is an adjacent suitable surface for landing based on depth information of the images if the surface directly below the unmanned aerial vehicle is not suitable for landing;

control the drive unit to rotate to cause the unmanned aerial vehicle to land at an adjacent suitable surface if there is an adjacent suitable surface is available; and control the drive unit to rotate to cause the unmanned aerial vehicle to hover evenly at the surface below the unmanned aerial vehicle if there is no adjacent suitable surface is available.

\* \* \* \* \*